United States Patent [19]

Marion et al.

[11] 3,945,942

[45] Mar. 23, 1976

[54] FUEL BURNER AND PROCESS FOR GAS MANUFACTURE

[75] Inventors: Charles P. Marion, Mamaroneck, N.Y.; Blake Reynolds, Riverside, Conn.

[73] Assignee: Texaco Development Corporation, New York, N.Y.

[22] Filed: Oct. 30, 1972

[21] Appl. No.: 302,167

Related U.S. Application Data

[62] Division of Ser. No. 186,207, Oct. 4, 1971, Pat. No. 3,758,037.

[52] U.S. Cl. ............ 252/373; 48/196 R; 48/197 R; 48/200; 48/201; 48/202; 48/215; 252/376
[51] Int. Cl.$^2$ ..................... C01B 1/16; C01B 2/02
[58] Field of Search ...... 252/376, 373; 48/215, 196, 48/197, 200-202

[56] References Cited
UNITED STATES PATENTS

| | | | |
|---|---|---|---|
| 1,980,132 | 11/1934 | Fletcher | 299/140 |
| 2,177,379 | 10/1939 | Van Nuys | 48/197 |
| 2,776,195 | 1/1957 | Wessolek | 48/215 |
| 2,928,460 | 3/1960 | Eastman et al. | 252/373 X |
| 3,048,476 | 8/1962 | Dwyer | 252/373 X |
| 3,528,930 | 9/1920 | Schlinger | 252/373 |
| 3,545,926 | 12/1970 | Schlinger et al. | 252/373 |
| 3,607,157 | 9/1971 | Schlinger et al. | 252/373 X |
| 3,620,698 | 11/1971 | Schlinger et al. | 252/373 |
| 3,639,261 | 2/1972 | Slater | 252/373 |
| 3,685,977 | 8/1972 | Goodman | 252/373 X |
| 3,694,373 | 9/1972 | Schlinger et al. | 252/373 |
| 3,738,940 | 6/1973 | Auer et al. | 252/373 |

FOREIGN PATENTS OR APPLICATIONS

| | | | |
|---|---|---|---|
| 591,713 | 2/1960 | Canada | 252/373 |

*Primary Examiner*—Howard T. Mars
*Attorney, Agent, or Firm*—T. H. Whaley; C. G. Ries; Albert Brent

[57] ABSTRACT

A partial oxidation burner and process for the manufacture of synthesis gas, reducing gas and other gas mixtures substantially comprising $H_2$ and CO. A hydrocarbon, oxygen-rich gas and, optionally, $H_2O$ or some other temperature moderator are introduced into the reaction zone of a synthesis gas generator in which, by partial oxidation at an autogenous temperature in the range of about 1700° to 3500°F. and a pressure in the range of about 1 to 250 atmospheres, said synthesis, fuel, or reducing gas is produced. For example, a hydrocarbon is introduced into the reaction zone by way of the inner assembly of a novel multitube burner, and a mixture of oxygen-rich gas and steam is passed through a coaxial conduit disposed about the outside of said inner assembly. Said inner assembly comprises a central conduit of circular cross-section, having a plurality of parallel open-ended tubes extending downstream from the exit end of said central conduit and in communication therewith. The tubes terminate in a surrounding nozzle, which is the exit end of the coaxial outer conduit.

5 Claims, 5 Drawing Figures

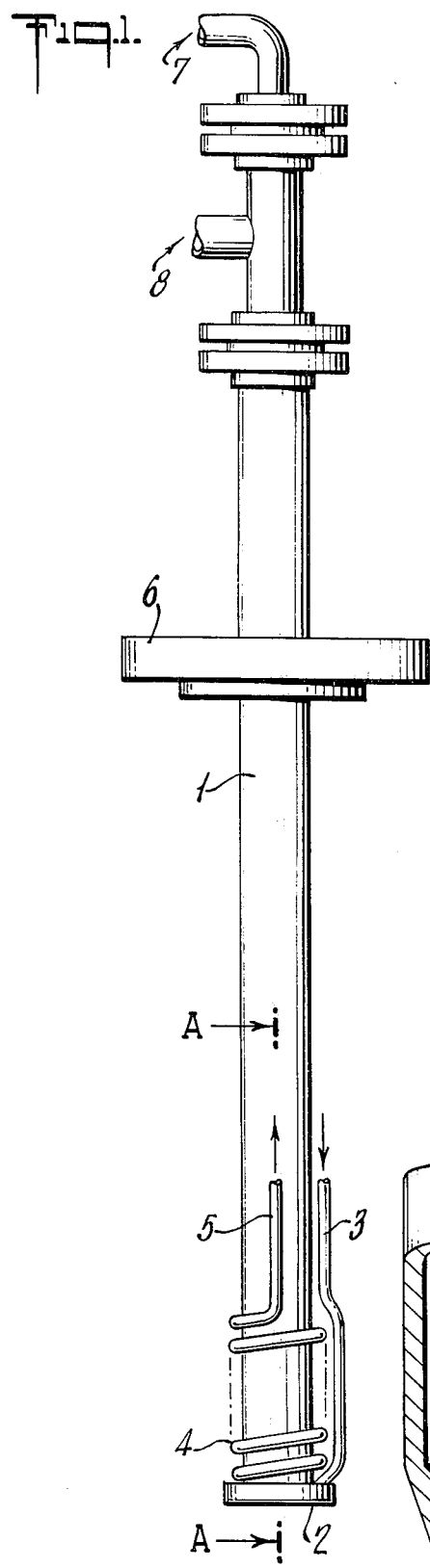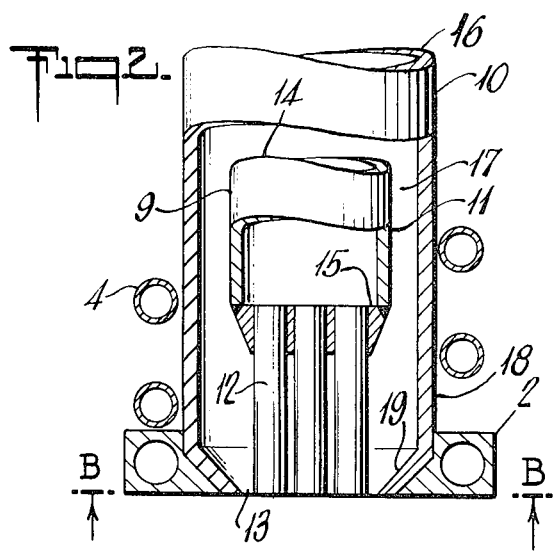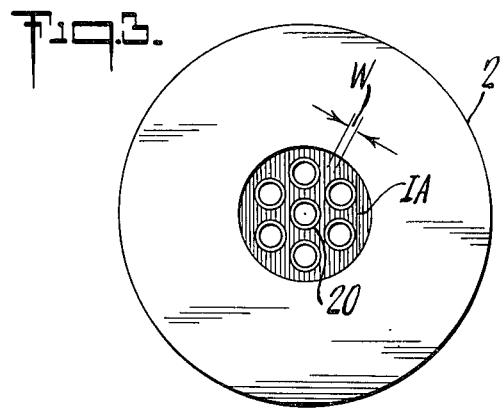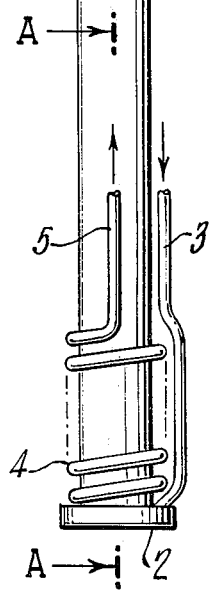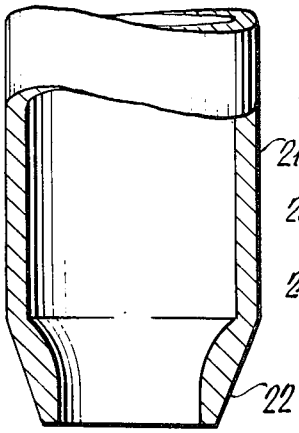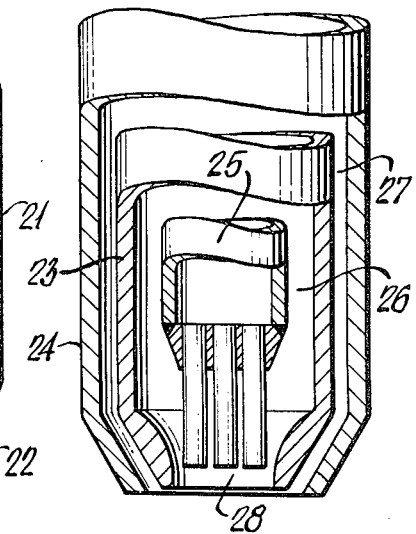

FUEL BURNER AND PROCESS FOR GAS MANUFACTURE

BACKGROUND OF THE INVENTION

1. Field of the Invention

This is a division of application Ser. No. 186,207, filed Oct. 4, 1971 now U.S. Pat. No. 3,758,037.

This invention relates to the manufacture of gaseous mixtures comprising $H_2$ and CO, e.g., synthesis gas, fuel gas, and reducing gas. In one of its more specific aspects, the present invention relates to a burner for such gas manufacture.

2. Description of the Prior Art

The manufacture of synthesis, reducing, and fuel gas by introducing hydrocarbon fuels, oxygen and steam into the reaction zone of a synthesis gas generator by way of a simple annulus-type burner is known in the art. However, the combustion efficiency of such prior art burners, especially those operating at low pressure, leaves much to be desired. Also, the reducing ratio, i.e. the mole ratio $(H_2 + CO)/CO_2 + H_2O)$ of the gas produced is comparatively low. By attempting to scale-up the size of prior art burners, it was found that the composition of the product gas changed and that the amount of unreacted particulate carbon increased. Further, it was often necessary and costly to maintain a high oxygen-to-hydrocarbon ratio in the feed to the generator in order to reduce the yield of unreacted particulate carbon to acceptable levels. This higher oxygen/hydrocarbon ratio produced excessively high temperatures in the reaction zone which shortened the life of the refractory lining.

SUMMARY OF THE INVENTION

More efficient partial oxidation of hydrocarbon fuels with oxygen and, optionally, with $H_2O$ or some other temperature moderator is attainable by providing a burner comprising an inner assembly consisting of a central conduit of circular cross section having a plurality of smaller open-ended tubes extending downstream from the exit end of said central conduit and in communication therewith. The individual tubes are parallel to the burner axis and to each other. They terminate within a surrounding nozzle, which is the exit end of a coaxial outer conduit. The coaxial conduit is disposed about said central conduit providing an annular passage therebetween for the free passage of one feed stream. Thus, the other feed stream passing through the central conduit is split into a plurality of parallel streams with the first feed material flowing between and around these streams. Normal feed modes include oxygen, oil, or oil-steam mixtures in the tubes, and oil-steam mixture, oxygen-steam mixture, or oxygen, respectively in the annular passage. These reactant streams may also be reversed and passed, respectively, through interchanged passages. Further, in a double-annulus multitube embodiment, oil may be passed through the central tubes, oxygen or oxygen-steam mixtures may be passed through an inner annulus, and steam may be passed through an outer annulus. By this mode, the life of the burner may be substantially increased.

DESCRIPTION OF THE INVENTION

The present invention involves a novel burner and the process for the manufacture of gas mixtures rich in hydrogen and carbon-monoxide, such as synthesis gas, fuel gas, and reducing gas, by the partial oxidation of a hydrocarbon with an oxygen-rich gas such as air, oxygen-enriched air or substantially pure oxygen and, optionally, with steam or another temperature moderator. The product gas mixture is produced in the reaction zone of a noncatalytic, refractory-lined, free-flow partial oxidation generator, such as described in co-assigned U.S. Pat. No. 2,809,104 issued to Dale M. Strasser et al.

In accordance with one embodiment of the present invention, the reactants are introduced into the reaction zone of the gas generator by means of a novel multitube burner. By means of said burner, a first stream of reactants flowing parallel to the burner axis is separated into a plurality of smaller streams also flowing parallel to the burner axis in a bundle of spaced parallel tubes. At least one additional stream of reactants is then interjected into the interstices between said bundle of tubes. Thus, a mixture of reactants is thereby produced which is discharged from the burner as a well distributed blend of reactant streams.

In further detail, a first reactant stream is passed through the inner assembly of said multitube burner. The burner inner assembly is made up of the central conduit having an open upstream end and a closed downstream end. A plurality of parallel open-ended tubes extend downstream from said closed end in a direction parallel to the axis of the central conduit. The individual tubes are in a spaced and symmetrical arrangement so that they do not touch each other. Further, each tube in the bundle is sealed into the closed end of the central conduit and is in communication therewith. A free passage is thereby produced for said first reactant stream through the central conduit and the bundle of tubes.

A second reactant stream is passed through a concentric coaxial open-ended conduit which is disposed lengthwise about the outside of said inner assembly. A tip section at the downstream end of said coaxial second conduit is provided for introducing said second reactant stream into the interstices between the parallel open-ended tubes and thence out through a nozzle at the end of this second conduit. Optionally, a concentric coaxial open-ended third conduit with a converging tip may be disposed lengthwise about said concentric coaxial open-ended second conduit. The tip section of said coaxial third conduit is provided for introducing a third fluid stream around said first and second fluid streams at or near the face of the burner.

In order to illustrate the invention in greater detail, reference is made to several embodiments involving burner constructions as shown in figures of the drawing, wherein FIG. 1 is a general illustration of a burner assembly;

FIG. 2 is a diagrammatic longitudinal cross-section through the downstream end of the burner, taken at line A—A of FIG. 1 and showing an embodiment of the burner;

FIG. 3 is an end view of the burner tip shown in FIG. 2, taken at line B—B.

FIG. 4 is a view of another example of coaxial conduit 10 in FIG. 2; and

FIG. 5 is a view similar to FIG. 2, but of another embodiment of the burner in which two coaxial concentric conduits are disposed longitudinally about the inner assembly.

Referring to the figures in the drawing, in FIG. 1 the burner assembly is indicated generally as 1. Face-cooling chamber 2 at the outermost tip of the burner is hollowed out for circulating cooling water, entering by way of inlet pipe 3 and leaving by way of coils 4 and outlet pipe 5. The axis of the burner is usually aligned along the central axis of the synthesis gas generator by means of mounting flange 6. Reactant streams pass into the burner by way of inlets 7 and 8.

In FIG. 2, the downstream end of burner 1 is shown in cross-section. This view is taken between A—A of FIG. 1 and comprises inner assembly 9 and concentric coaxial conduit 10 disposed longitudinally about the inner assembly, thereby providing a free annular passage in between elements 9 and 10. A reactant stream enters burner 1 by way of inlet 7 of FIG. 1 and passes directly through inner assembly 9. A second stream enters burner 1 by way of inlet 8 of FIG. 1 and passes directly into concentric coaxial conduit 10.

Inner assembly 9 comprises central conduit 11 of circular cross-section and a bundle of comparatively small diameter open-ended tubes 12. The bundle of tubes extends downstream from the exit end of the central conduit 11. The tubes are parallel to the burner axis and to each other. The plurality of tubes are in a spaced and symmetrical arrangement about the burner axis and do not touch each other. While these tubes preferably extend close to the burner face 13 as shown in the drawing, in other embodiments of the burner, such as shown in FIG. 5, they may be foreshortened. Central conduit 11 is open at the inlet end 14 and closed at exit 15. Tubes 12 are sealed into the exit end of conduit 11 and are in communication therewith. Thus, a reactant stream may be freely passed through inner assembly 9 by being passed first through central conduit 11 and then through a plurality of tubes in the bundle 12. The upstream portion 16 of concentric coaxial conduit 10 is open and forms an annular passage 17 with the central conduit 11 through which a reactant stream may be freely passed. The downstream end 18 of coaxial conduit 10 is disposed about the bundle of tubes 12. A converging nozzle 19 is at the tip of the downstream end of coaxial conduit 10 to facilitate intermixing the streams and to force a flat velocity profile across the interstitial stream. Suitable angles of convergence at the tip are in the range of 15° to 90°. Optionally, cooling means may be provided to cool the burner tip, for example, face-cooling chamber 2 and cooling coils 4.

FIG. 3 is an end view of burner 1 in FIG. 2 taken along B—B. A suitable layout of seven parallel tubes in the bundle of tubes 12 is depicted, with tube 20 passing through the axis of the burner. Shaded cross-sectional area I.A. shows the interstices between the outside surfaces of the tubes. This represents the area available for introducing the reactant stream which passes freely through the passage between inner assembly 9 and coaxial conduit 10. Thus, there is provided thorough intermixing of the reactant streams from the separate burner passages at the face of the burner.

Typical combinations of reactant streams which may be introduced into the reaction zone of the synthesis gas generator by way of the multitube burner depicted in FIGS. 1 to 3 are shown in Table 1.

TABLE I

|     | Stream Passing Through Inner Assembly 9 | Stream Passing Through Concentric Conduit 10 |
|-----|------------------------------------------|----------------------------------------------|
| (1) | oxygen rich gas                          | liquid hydrocarbon fuel-$H_2O$               |
| (2) | oxygen rich gas                          | gaseous hydrocarbon fuel                     |
| (3) | liquid hydrocarbon fuel-$H_2O$           | oxygen rich gas                              |
| (4) | gaseous hydrocarbon fuel                 | oxygen rich gas                              |
| (5) | liquid hydrocarbon fuel                  | oxygen rich gas-$H_2O$                       |
| (6) | liquid hydrocarbon fuel-$H_2O$           | oxygen rich gas-$H_2O$                       |

The term hydrocarbon, as used herein to describe various feed-stocks, is intended to include gaseous and liquid hydrocarbon fuels. Also included by definition are (1) pumpable slurries of solid carbonaceous fuels, such as coal, particulate carbon, and petroleum coke in a carrier or moderator such as water, or in a liquid hydrocarbon fuel, and mixtures thereof and (2) gas-solid suspensions, such as finely-ground solid carbonaceous fuels dispersed in either the moderator or a gaseous hydrocarbon.

The term liquid hydrocarbon fuel as used herein to describe liquid feedstock is intended to include various materials such as liquified petroleum gas; petroleum distilates and residues, gasoline, naphtha, kerosine, crude petroleum, asphalt, gas oil, residual oil, tar sand oil; aromatic hydrocarbons, such as benzene, toluene, xylene fractions, coal tar, cycle gas oil from fluid catalytic cracking operation; furfural extract of coker gas oil; and mixtures thereof. Gaseous hydrocarbon fuels as used herein to describe gaseous feedstocks, include methane, ethane, propane, butane, pentane, natural gas, water gas, coke oven gas, refining gas, acetylene tail gas, ethylene off-gas and mixtures thereof. Both gaseous and liquid feeds may be mixed and used simultaneously and may include paraffinic, olefinic and aromatic compounds in any proportion. The hydrocarbon feed may be at room temperature or may be preheated to a temperature up to as high as about 600° to 1200°F., but below its cracking temperature. The liquid hydrocarbon feed may be introduced into the burner in liquid phase or in a vaporized mixture with or without steam or other moderator.

The term oxygen-rich gas, as used herein, is intended to include air, oxygen-enriched air, i.e., greater than 21 mole % oxygen, and substantially pure oxygen, i.e. greater than 95 mole % oxygen. Oxygen-rich gas may be introduced into the burner at a temperature in the range of about ambient to 1800°F. The ratio of free oxygen to carbon in the feedstock (O/C, atom/atom) is in the range of 0.7 to 1.5.

$H_2O$ may be charged to the reaction zone in liquid or gaseous phase. It may be in the form of steam or atomized liquid water. Further, all of the $H_2O$ may be mixed either with the hydrocarbon feedstock or with the oxygen-rich gas. Alternately, a portion of the steam may be intermixed with the oxygen stream in conduit 10 in an amount less than about 25 weight percent of the oxygen and any remainder mixed with the hydrocarbon. The $H_2O$ may be at a temperature in the range of ambient to 1000° F., or above. For example, the weight ratio of water to liquid hydrocarbon feed is in the range of about 0.05 to 6, and usually in the range of about 0.15 to 0.6 parts by weight of water per part by weight of hydrocarbon feed, according to the final use of the product gas.

H$_2$O serves to moderate the temperature in the reaction zone of the synthesis gas generator. It may also react with the other feedstreams in the generator. Other suitable temperature moderators which may be used in place of or in combination with H$_2$O include a cooled portion of the product gas, cooled off-gas from an integrated ore-reduction zone, e.g. blast furnace, carbon dioxide, various off gases from other processes, an inert gas, e.g. nitrogen, and mixtures thereof.

The use of a temperature moderator to moderate the temperature in the reaction zone is optional and depends in general on the carbon to hydrogen ratio of the feed stock. For example, a temperature moderator is generally not used with gaseous hydrocarbon fuels; however, generally it is used with liquid hydrocarbon fuels. As previously mentioned, the temperature moderator may be introduced as a component of either or both reactant streams. In addition, the temperature moderator may be introduced by itself via a separate outer conduit as will be described in connection with the embodiment shown in FIG. 5.

The feedstreams are reacted by partial oxidation without a catalyst in the reaction zone of a free-flow synthesis gas generator. The temperature is autogenously maintained within a range of about 1700° to 3500°F. The pressure is in the range of about 1 to 250 atmospheres. The mixture of product gases may have the following composition (volume % – dry basis) assuming the inert gases are negligible: CO 33–52, H$_2$ 62–42, CO$_2$ 1.5–8, CH$_4$ 0.02–2, H$_2$S nil – 2.0 and COS nil to 0.1. Unreacted particulate carbon (basis carbon in the feed by weight) is about 0.2 to 10 weight percent from liquid feeds but is usually negligible from gaseous hydrocarbon feeds.

As previously described, by means of the subject burner a large volume of a first reactant stream flowing through the central circular conduit is split into a plurality of separate streams of reactant fluid flowing through a bundle of parallel tubes. This permits the introduction of a second stream of reactants into the the interstices surrounding the tubes. The greater the number of tubes, the better the distribution of one reactant within the other reactant. The mixing of the reactant streams which takes place downstream of the ends of the tubes is facilitated by this improved distribution. Such efficient mixing of the feedstreams facilitates a more uniform partial oxidation of the hydrocarbon to produce H$_2$ and CO. The combustion efficiency of the process is thus increased.

By means of the subject invention, reactions are made to proceed in local regions where there is less opportunity for overheating the hydrocarbon with an insufficient supply of oxygen to result in the formation of soot. Thus, the amount of unconverter particulate carbon produced for a given oxygen to carbon atomic ratio in the feed may be substantially reduced. Further, "overburning" of the hydrocarbon to produce carbon dioxide is substantially reduced. It is recommended that the subject burner be made from heat and oxidation-resistant metal alloys.

In the case of liquid hydrocarbon as one of the feed streams, to improve the atomization of the effluent stream from the burner, a differential stream velocity is maintained. Thus, the reactant stream passing through exit nozzle 19 in FIG. 2 is accelerated to a suitable high velocity and a flat velocity profile across the interstitial cross-section is provided. Atomization of the liquid stream takes place at or near the face of the burner, producing a fine mist of hydrocarbon dispersed in the oxygen and the temperature moderator. For example, a liquid hydrocarbon may be passed through each tube in the bundle of tubes 12 at a velocity of about 5 to 50 feet per second at the face of the burner, while a mixture of oxygen-rich gas and steam may be passed through annulus 17 and then accelerated in the surrounding nozzle 19 to a velocity of about 200 feet per second to sonic velocity at the face of the burner. In another example, an oxygen-rich gas, such as substantially pure oxygen is passed through each tube of the bundle of tubes 12 at a velocity of about 300 feet per second to sonic velocity while an atomized mixture of liquid hydrocarbon and steam is passed through annulus 17 so as to be accelerated by the surrounding nozzle to a velocity of about 150 feet per second to sonic velocity at the burner face.

The velocity of a gaseous hydrocarbon feedstock through the plurality of tubes or through the annulus is substantially the same as that previously given for the velocity of the oxygen containing stream i.e. 200 feet per second to sonic velocity.

The velocity of each reactant stream must be sufficient to keep the partial oxidation reaction downstream from the downstream end of the burner, thereby preventing flash-back of the flame with resultant damage to the burner tip.

The individual tubes in the bundle of tubes 12, shown in FIG. 2 should be long enough to permit the reactant stream flowing in annulus 17 to flow evenly into the interstices between the tubes, as shown in FIG. 3. For example, the following relationship shown in formula (1) is suggested as a minimum:

$$I.A./l. \ w. \ n. = \frac{1}{2} \qquad (1)$$

Where:
$l$ = length of each tube
$w$ = separation between adjacent tubes at narrowest gap, as shown in FIG. 3
$n$ = number of tubes
$I.A.$ = cross-sectional area of interstices — see FIG. 3

Actually, the length of the tubes in the tube bundle may range from about ½ inch to 12 inches or longer and preferably from about 2 to 5 inches, with greater lengths required as the number of tubes and the total size of the burner increases.

The number of tubes in the tube bundle and their typical sizes, i.e. inside diameter (I.D.) are shown in Table II.

TABLE II

| Internal Stream | Number of Tubes in Tube Bundle | I.D. of Individual Tube-Inches |
|---|---|---|
| Liquid | 2 to about 200 or more | 1/16 to 1/4 |
| Gaseous | 2 to about 200 or more | .090 to 1 |

Preferably, in order to obtain an equal flow distribution in all of the tubes 12, the inside diameters of the tubes should be equal and their lengths should be equal. The inside diameter of the tubes should be small compared to the diameter of central conduit 11 in order to force an appreciable pressure drop from the central conduit to discharge. Preferably, the ratio of length to inside diameter of the tubes should be at least 5.

Preferably, the downstream exit ends of the plurality of tubes 12 and the exit end of coaxial concentric conduit 10 terminate in the same plane perpendicular to the burner axis at the downstream end of the burner, which may be also referred to as the burner face. In another embodiment of the invention the plurality of tubes terminate in a plane perpendicular to the axis of said coaxial concentric conduit, and said plane is retracted upstream from the downstream end of the tip section of said coaxial concentric conduit in order to permit a limited degree of premixing but no burning, thereby preventing damage to the ends of the tubes and to the end of the tip section. In still another embodiment of the invention the exit ends of all of said plurality of tubes terminate in a plane perpendicular to the axis of said coaxial concentric conduit, and said plane is located downstream from the downstream end of the tip section of said coaxial concentric conduit; for example slightly downstream from the burner face.

Alignment pins, fins, locking lugs and other means may be used to symmetrically space the tubes and conduits with respect to each other.

Although developed for the partial oxidation reaction, this burner may be used advantageously for other types of combustion of a hydrocarbon by an oxidant stream e.g. heat release in a boiler, or for producing reducing gas within a blast furnace or other ore reduction unit.

FIG. 4 is another version of a coaxial concentric conduit 21 which may be used in place of conduit 10 as shown in FIG. 2. Note that tip 22 of conduit 21 is provided with a smooth ellipsoidal converging nozzle whose walls develop into a straight cylindrical portion which is coaxial with the burner axis near the outermost tip of the nozzle. For example, the American Society of Mechanical Engineers (A.S.M.E.) standard long-radius nozzle is suitable. A further description of said nozzle may be found in "Thermodynamics Fluid Flow and Heat Transmission" by Huber O. Croft, page 155, First Edition, 1938 McGraw-Hill Book Company.

FIG. 5 is another embodiment of the burner and provides two coaxial concentric conduits, i.e., intermediate conduit 23 and outermost conduit 24, disposed about inner assembly 25. Inner annulus passage 26 and outer annulus passage 27 are thereby provided for the free passage of separate feed streams. The purpose of the outer annulus is to provide a relatively non-reactive stream (moderator) separating the surrounding product synthesis gas from the feed stream in the interstitial area. This separation is particularly desirable when the interstitial fluid is the oxidant, which can react rapidly with synthesis gas close to the burner tip and cause burner tip deterioration. In other words, the third passage is useful primarily to provide greater burner durability rather than to promote higher combustion efficiency. The use of this protective sheath is not justified except in those cases which would otherwise result in unacceptably short burner life.

The construction of the several elements of FIG. 5 has been previously described in connection with FIGS. 1–4. Cooling the burner is optional. For example, if desired, face cooling plate 2 and cooling coil 4 may be added to the burner shown in FIG. 5. Further, note that the tubes in the tube bundle do not necessarily extend to the burner face. Optionally, the ends of the tubes may be flush with or extend beyond the burner face, i.e. the downstream end of the burner.

Typical combination of streams which may be introduced into the reaction zone of the synthesis gas generator by way of the double-annulus multitube burner depicted in FIG. 5 are shown in Table III.

TABLE III

| | Inner Assembly 25 | Inner Annulus 26 | Outer Annulus 27 |
|---|---|---|---|
| (1) | hydrocarbon feed | oxygen rich gas-$H_2O$ | temp. moderating gas |
| (2) | hydrocarbon feed | oxygen rich gas | temp. moderating gas |
| (3) | hydrocarbon feed-$H_2O$ | oxygen rich gas-$H_2O$ | temp. moderating gas |
| (4) | hydrocarbon feed-$H_2O$ | oxygen rich gas | temp. moderating gas |

The velocity and thickness of the sheath of temperature moderating gas leaving the burner by way of the converging nozzle on the downstream end of outer annulus 27 is preferably such as to prevent the oxygen in the inner annulus 26 from contacting and reacting with recirculating synthesis gas that is close enough to the burner face to cause damage to the outer tip. For example, the exit velocity of the stream of temperature moderating gas in outer annulus 27 may be about one half that of the oxygen stream.

Thus, in all cases an annular jet of steam or other moderator in outer annulus 27 serves to protect the outer nozzle from damage resulting from combustion between oxygen and synthesis gas at the burner tip. In some modes, sufficient steam may be added to the other streams to facilitate atomization of the hydrocarbon feed or to prevent tip damage.

The burner size or scale is important in relating the required atomic ratio of oxygen in the oxygen-rich gas to carbon in the hydrocarbon feed needed to reach a given yield of unconverted particulate carbon in the product gas. The burner scale factor is (1) proportional to the interfacial perimeter available for mixing the reactant in the tubes with the reactant stream in the interstices between the tubes; (2) inversely proportional to the cross-section of the stream (in the tubes) to be mixed; (3) inversely proportional to the relative distance into the interstitial stream which must be traversed by elements (molecules or turbulent eddies) of the stream in the tubes during mixing; and (4) is a function of the Y ratio which is by definition the ratio of the interstitial area (I.A. of FIG. 3) to the total cross sectional area of tubes 12 based on the inside diameter of the tubes. For example, the burner scale factor as shown in formula (2) below has been derived as a measure of the relative size of a burner as shown in FIG. 2, when an oil containing stream is passed through the tubes of a burner having a Y ratio of 21.7.

$$P/SL = 48.2 \, n/D_2^2 \qquad (2)$$

in which $P$ = sum of the perimeters of all tubes 12 (based on inside tube diam.)

$S$ = sum of the cross sectional areas of all of the tubes 12 (based on inside tube diam.)
$n$ = number of tubes
$D_2$ = Inside diam. of downstream end of converging nozzle 19

$$L = \frac{1}{2}\left(\frac{D_2}{\sqrt{n}} - D_o\right)$$

Wherein $D_o$ = inside diameter of each tube 12.

It will be shown that as the burner scale factor increases, the percent unconverted carbon in the product gas for a given O/C, i.e., ratio of atoms of oxygen per atom of carbon in the feed decreases, and the reducing ratio in the product gas increases. Thus, one would preferably design for the highest practical burner scale factor to achieve minimum soot yield for a given O/C ratio. For example, with respect to the burner shown in FIG. 2, with a Y ratio of 21.7, the burner scale factor P/SL should not be less than a minimum value of 266 in order to yield 2 wt.% particulate carbon at about 1.04 O/C ratio.

EXAMPLES OF THE PREFERRED EMBODIMENT

The following examples are offered as proof of the efficacy of the present invention, but the invention is not to be construed as limited thereto.

EXAMPLE I

Reducing gas was produced in a reducing gas generator by the partial oxidation of heavy fuel oil having an API of 13° and a gross heating value of 18,300 BTU per pound by reaction with substantially pure oxygen in the presence of steam. A 6 foot gas generator was used consisting of a refractory lined steel pressure vessel free from catalyst or any obstruction to the free-flow of materials therethrough. The combustion chamber volume was about 60 cubic feet.

The feedstreams were introduced into the reaction zone by way of a multitube burner mounted in an axial flanged port at the top of the gas generator. Thus, a stream of fuel oil at a temperature of about 390°F was passed through the central conduit and the bundle of seven tubes of the multitube burner, shown in FIGS. 1–3 of the drawing. The burner tubes extended freely about 0.62 inches beyond the end of the central conduit. They were 3/16 inches outside diameter (O.D.) and had a 0.049 inch wall. With a Y ratio of 21.7 the burner scale factor P/SL was 226. The velocity of the oil in the tubes was about 33 feet per second.

A mixture of substantially pure oxygen and steam at a temperature of about 360°F was passed through the annulus of the burner so that a velocity of about 850 feet per second was reached at the burner face. Pressure in the reaction zone was 30–31 psig and the weight ratio of steam to fuel oil was about 0.23.

When the atomic ratio of oxygen to carbon in the feed was 1.04, the "reducing ratio" was about 6.9. At this O/C ratio, the weight percent of unconverted carbon in the product gas (basis weight of carbon in the feed) was about 2.0 wt. percent. Also, the composition of the product gas in volume percent dry basis was Co 52.42, $H_2$ 43.91, $CO_2$ 3.17, $H_2S$ 0.14, A 0.11 and $N_2$ 0.25.

In comparison, under substantially the same generator operating conditions a one-tube conventional burner, such as shown in FIG. 2 of the U.S. Pat. No. 2,928,460 issued to Du Bois Eastman et al., having a burner scale factor of 33 and a Y ratio of 14.3 yielded 3.6 weight percent unconverted particulate carbon for the same atomic ratio O/C of 1.04. Further, the reducing ratio decreased to 6.4.

EXAMPLE II

This example illustrates the effect of further increasing the number of tubes in the tip of the inner assembly, shown in FIGS. 2 and 3 of the drawing.

Twelve symmetrically spaced metal tubes 0.152 inches O.D. with 0.032 inches wall were used to replace the seven tubes extending from the central conduit in the burner described in Example I. With a Y ratio of 19.7, the burner scale factor P/SL was 291. With all other conditions remaining substantially the same, it was found that less oxygen was required with the 12 tube burner than with the seven tube burner to produce reducing gas having 2 weight percent of unconverted carbon. The O/C atomic ratio was about 1.025 for the burner with 12 tubes and 1.04 for the burner with seven tubes, versus 1.09 for the original burner having a single central nozzle. Thus, by increasing the number of tubes in the burner, oxygen consumption in the gas generator is reduced at a decided economic advantage. Further, reduced oxygen consumption contributes to lower temperatures in the reaction zone, which benefits the refractory lining. In other words, with a fixed O/C atomic ratio, i.e. 1.04, and all other operating conditions substantially the same, when a 7 tube burner is replaced by a 12 tube burner, the weight percent of unconverted carbon is reduced from 2 weight percent to about 1.4 weight percent. This result represents a 30% drop in the production of unconverted carbon, and also simplifies or eliminates any purification problems relating to the recovery of particulate carbon from the product gas. Further, the reducing ratio 6.4 with the 1-tube burner is increased to 6.9, with the 7 tube burner and to 7.2 with the 12 tube burner. Thus, the quality of the reducing gas may be improved by increasing the number of tubes. This permits the reduction in the volume of reducing gas necessary for a given operation thereby reducing costs. For example, by using mutitube burners, there is a reduction in the amount of reducing gas required to replace the metallurgical coke in an iron-ore blast furnace for the production of molten iron. This permits equipment and piping to be sized smaller in addition to cost savings for the reducing gas.

Although modifications and variations of the invention as set forth above may be made without departing from the spirit and scope thereof, only such limitations should be imposed as are indicated in the appended claims.

We claim:

1. In a continuous process for the manufacture of gas mixtures rich in hydrogen and carbon monoxide by the partial oxidation of a reactant stream selected from the group consisting of gaseous hydrocarbon fuel, liquid hydrocarbon fuel, and pumpable slurries of solid carbonaceous fuel with a reactant stream of oxygen-rich gas selected from the group consisting of air, oxygen-enriched air containing more than 21 mole % oxygen, and substantially pure oxygen containing more than 95 mole % oxygen in an amount providing a weight ratio of free oxygen to carbon in the feed stock in the range of 0.7 to 1.5, and in the presence of a temperature moderator selected from the group consisting of steam, atomized liquid water, $CO_2$, cooled portion of product gas, cooled off-gas from an ore-reduction zone, inert gas such as nitrogen, and mixtures thereof; said partial oxidation reaction occurring in the reaction zone of a free flow gas generator at an autogenous temperature in the range of about 1700° to 3500°F and at a pressure in the range of about 1 to 250 atmospheres, the improvement which comprises (1) splitting one of said reactant streams optionally in admixture with a portion of said temperature moderator into a plurality of smaller streams flowing through tubes parallel to each other and without touching each other in a symmetrically spaced bunch; (2) simultaneously passing in the same direction as said streams of first reactant said other reactant stream optionally in admixture with a portion of said temperature moderator into the interstices between each of said plurality of parallel tubes; (3) mixing the reactant streams from (1) and (2) together to produce a well distributed blend; and (4) burning the mixture from (3) downstream in said reaction zone.

2. The process as described in claim 1 wherein said hydrocarbon fuel and slurries of solid carbonaceous fuel are selected from the group consisting of liquified petroleum gas, petroleum distilates and residues, gasoline, naphta, kerosine, crude petroleum, asphalt, gas oil, residual oil, tar sand oil, benzene, toluene, xylene, coal tar, cycle gas oil from fluid catalytic cracking, furfural extract from coker gas oil, methane, ethane, propane, butane, pentane, natural gas, water gas, coke oven gas, refining gas, acetylene, ethylene; slurries of solid carbonaceous fuels such as coal, particulate carbon, and petroleum coke in water or in a liquid hydrocarbon fuel, suspension of finely ground carbonaceous fuels in gaseous hydrocarbon fuels; and mixtures thereof.

3. The process of claim 1 wherein said parallel reactant streams in step (1) comprise liquid hydrocarbon fuel at a velocity in the range of about 5 to 50 feet per second; and said other reactant stream being passed through the interstices of said plurality of parallel tubes in step (2) is a mixture of steam and oxygen-rich gas at a velocity in the range of about 200 feet per second to sonic velocity.

4. The process of claim 1 wherein said plurality of parallel reactant streams in step (1) comprises oxygen-rich gas at a velocity in the range of about 300 feet per second to sonic velocity; and said other reactant stream being passed through the interstices in step (2) comprises a mixture of steam and liquid hydrocarbon fuel at a velocity in the range of about 150 feet per second to sonic velocity.

5. The process of claim 1 wherein said plurality of parallel streams in step (1) comprises liquid hydrocarbon fuel; said other reactant stream being passed through the interstices in step (2) comprises oxygen-rich gas; and with the additional step of simultaneously passing a gaseous sheath of said temperature moderator around said oxygen-rich gas.

* * * * *